(12) United States Patent
Maruo et al.

(10) Patent No.: US 9,991,528 B2
(45) Date of Patent: Jun. 5, 2018

(54) FUEL CELL SYSTEM

(71) Applicant: TOYOTA JIDOSHA KABUSHIKI KAISHA, Toyota-shi, Aichi-ken (JP)

(72) Inventors: Tsuyoshi Maruo, Toyohashi (JP); Yoshiaki Naganuma, Toyota (JP); Tomohiro Ogawa, Toyota (JP); Masashi Toida, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 154 days.

(21) Appl. No.: 14/938,047

(22) Filed: Nov. 11, 2015

(65) Prior Publication Data
US 2016/0141650 A1 May 19, 2016

(30) Foreign Application Priority Data

Nov. 14, 2014 (JP) ................... 2014-232229

(51) Int. Cl.
*H01M 8/04* (2016.01)
*H01M 8/04089* (2016.01)
*H01M 8/04664* (2016.01)
*H01M 8/04746* (2016.01)
*H01M 8/0432* (2016.01)
(Continued)

(52) U.S. Cl.
CPC ... *H01M 8/04097* (2013.01); *H01M 8/04358* (2013.01); *H01M 8/04388* (2013.01); *H01M 8/04514* (2013.01); *H01M 8/04664* (2013.01); *H01M 8/04761* (2013.01)

(58) Field of Classification Search
CPC combination set(s) only.
See application file for complete search history.

(56) References Cited

U.S. PATENT DOCUMENTS 7,718,286 B2 * 5/2010 Fujita ................ H01M 8/04097
429/444
2003/0162065 A1 * 8/2003 Miyauchi .......... H01M 8/04029
429/414
(Continued)

FOREIGN PATENT DOCUMENTS

CN  102195050 A  9/2011
EP  1916731 A1  4/2008
(Continued)

*Primary Examiner* — Kaity Chandler
(74) *Attorney, Agent, or Firm* — Hunton Andrews Kurth LLP

(57) ABSTRACT

A fuel cell system includes: a fuel cell; a fuel gas path supplied with fuel and allowing a part of fuel gas discharged from the fuel cell to circulate; an exhaust mechanism discharging the reacted fuel gas to an outside; a circulation mechanism circulating the fuel gas; and a control unit configured to temporarily stop circulation of the fuel gas by the circulation mechanism when determining that discharge from the exhaust mechanism is not normal, drive the circulation mechanism so that the fuel gas circulates at a first circulation speed when determining that the discharge is not normal and a parameter relating to water vapor in the fuel gas path is equal to a predetermined value or greater, and drive the circulation mechanism so that the fuel gas circulates at a second circulation speed greater than the first circulation speed when determining that the discharge is normal.

6 Claims, 2 Drawing Sheets

(51) Int. Cl.
*H01M 8/0438* (2016.01)
*H01M 8/04492* (2016.01)

(56) References Cited

U.S. PATENT DOCUMENTS

| | | | | |
|---|---|---|---|---|
| 2003/0217773 | A1* | 11/2003 | Yamada | H01M 8/04097 137/565.33 |
| 2004/0106026 | A1 | 6/2004 | Fujita et al. | |
| 2007/0082240 | A1 | 4/2007 | Fujita | |
| 2009/0011300 | A1* | 1/2009 | Yagi | H01M 8/04029 429/410 |
| 2009/0020281 | A1* | 1/2009 | Ueda | F24D 11/005 165/287 |
| 2009/0053566 | A1 | 2/2009 | Naganuma | |
| 2010/0055511 | A1* | 3/2010 | Miyata | H01M 8/04231 429/429 |
| 2010/0196771 | A1* | 8/2010 | Igarashi | H01M 8/04097 429/428 |
| 2010/0216045 | A1* | 8/2010 | Ishibashi | H01M 8/04231 429/446 |
| 2010/0248045 | A1* | 9/2010 | Sakai | H01M 8/04007 429/413 |
| 2011/0070508 | A1* | 3/2011 | Tanaka | H01M 8/04089 429/410 |
| 2011/0212371 | A1 | 9/2011 | Itoga | |
| 2012/0100449 | A1* | 4/2012 | Araki | H01M 8/04029 429/429 |
| 2012/0107706 | A1 | 5/2012 | Tanaka et al. | |
| 2012/0141898 | A1 | 6/2012 | Tanaka et al. | |
| 2012/0189925 | A1* | 7/2012 | Matsusue | H01M 8/04223 429/414 |
| 2013/0071767 | A1* | 3/2013 | Katano | H01M 8/04097 429/444 |
| 2016/0133971 | A1* | 5/2016 | Naganuma | H01M 8/04768 429/434 |
| 2016/0141655 | A1* | 5/2016 | Naganuma | B60L 11/1881 429/414 |
| 2016/0141682 | A1* | 5/2016 | Yamanaka | H01M 8/04753 429/414 |
| 2016/0141684 | A1* | 5/2016 | Yamanaka | G05D 7/0635 429/444 |
| 2016/0141686 | A1* | 5/2016 | Maruo | H01M 8/04761 429/429 |
| 2016/0141687 | A1* | 5/2016 | Yamamoto | H01M 8/04776 429/414 |
| 2016/0141693 | A1* | 5/2016 | Hotta | H01M 8/04164 429/414 |

FOREIGN PATENT DOCUMENTS

| | | |
|---|---|---|
| JP | 2004172025 A | 6/2004 |
| JP | 2007220425 A | 8/2007 |
| JP | 2008-097841 A | 4/2008 |
| JP | 2011181341 A | 9/2011 |
| JP | 5066358 B2 | 11/2012 |
| KR | 2006-0058737 A | 5/2006 |
| WO | 00/74162 A1 | 12/2000 |
| WO | 2010/150337 A1 | 12/2010 |
| WO | 2011/021301 A1 | 2/2011 |

* cited by examiner

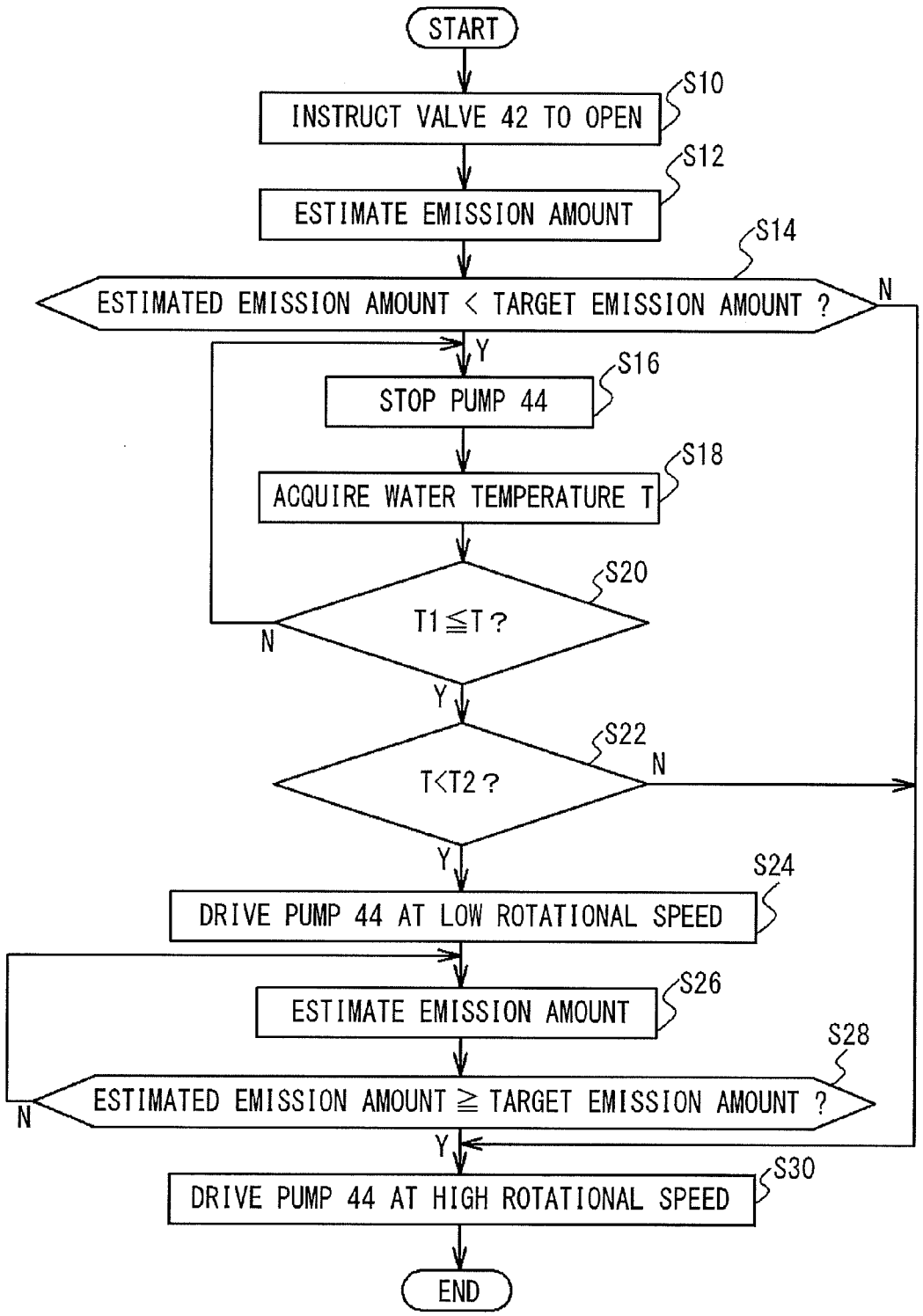

FUEL CELL SYSTEM

CROSS-REFERENCE TO RELATED APPLICATION

This application is based upon and claims the benefit of priority of the prior Japanese Patent Application No. 2014-232229, filed on Nov. 14, 2014, the entire contents of which are incorporated herein by reference.

FIELD OF THE INVENTION

The present invention relates to a fuel cell system.

BACKGROUND

A fuel cell generates electric power by a chemical reaction between hydrogen as fuel and air containing oxygen as oxidant. The fuel cell system may use a circulation mechanism to circulate unreacted fuel gas (hydrogen gas) discharged from the fuel cell. In this case, not only the hydrogen gas but also nitrogen and water are in a hydrogen gas circulation conduit. Thus, impurities such as nitrogen gas and water are concentrated as the operation continues. Hence, the fuel cell system often has an exhaust mechanism that discharges gas and a part of water from a hydrogen gas exhaust conduit as necessary to achieve a hydrogen partial pressure needed for power generation.

At low temperature starting such as starting below a freezing point, water left in the fuel cell or the like may freeze and clog a part of the hydrogen gas exhaust conduit. In this case, when a hydrogen gas conduit is a circulation conduit, the hydrogen gas is reduced due to the chemical reaction with oxygen in the fuel cell, while unreacted nitrogen gas is not discharged from the hydrogen gas exhaust conduit, and the nitrogen gas is accumulated and concentrated in the clogged hydrogen gas exhaust conduit. As a result, the hydrogen partial pressure decreases, and the power generation voltage of the fuel cell decreases. When the power generation voltage decreases to a negative voltage, the fuel cell may deteriorate. International Publication No. 2011/021301 discloses an art that stops a pump used to circulate hydrogen when a hydrogen gas conduit in the fuel cell is clogged. The stopping of the pump stops the circulation of nitrogen, prevents the nitrogen from flowing into the fuel cell, and reduces the decrease in hydrogen partial pressure.

SUMMARY OF THE INVENTION

It is an object of the present invention to provide a fuel cell system capable of preventing the freeze of a circulation mechanism and the deterioration of the fuel cell at low temperature starting.

According to an aspect of the present invention, there is provided a fuel cell system including: a fuel cell; a fuel supply source; a fuel gas path that is connected to the fuel cell, is supplied with fuel from the fuel supply source, and allows a part of fuel gas discharged from the fuel cell to circulate therethrough; an exhaust mechanism that discharges the fuel gas after reaction in the fuel cell to an outside; a circulation mechanism that is disposed in the fuel gas path and circulates the fuel gas; and a control unit, wherein the control unit temporarily stops circulation of the fuel gas by the circulation mechanism when determining that discharge from the exhaust mechanism is not normal, the control unit drives the circulation mechanism so that the fuel gas circulates at a first circulation speed when determining that the discharge from the exhaust mechanism is not normal and a parameter relating to water vapor in the fuel gas path is equal to or greater than a predetermined value, and the control unit drives the circulation mechanism so that the fuel gas circulates at a second circulation speed when determining that the discharge from the exhaust mechanism is normal, the first circulation speed being less than the second circulation speed.

According to another aspect of the present invention, there is provided a fuel cell system including: a fuel cell; a fuel supply source; a fuel gas path that is connected to the fuel cell, is supplied with fuel from the fuel supply source, and allows a part of fuel gas discharged from the fuel cell to circulate therethrough; an exhaust mechanism that discharges the fuel gas after reaction in the fuel cell to an outside; a circulation mechanism that is disposed in the fuel gas path and circulates the fuel gas; a temperature detection unit configured to detect a temperature of a coolant that cools the fuel cell; and a control unit, wherein the control unit temporarily stops circulation of the fuel gas by the circulation mechanism when determining that discharge from the exhaust mechanism is not normal, the control unit drives the circulation mechanism so that the fuel gas circulates at a first circulation speed when determining that the discharge from the exhaust mechanism is not normal and the temperature of the coolant detected by the temperature detection unit is equal to or greater than a predetermined temperature, and the control unit drives the circulation mechanism so that the fuel gas circulates at a second circulation speed when determining that the discharge from the exhaust mechanism is normal, the first circulation speed being less than the second circulation speed.

BRIEF DESCRIPTION OF THE DRAWINGS

FIG. 2 illustrates a flowchart of a process executed by the fuel cell system.

DETAILED DESCRIPTION

At low temperature starting, not only the hydrogen gas exhaust conduit but also the exhaust mechanism for discharging impurities such as nitrogen gas and water from a circulation path may freeze. The freeze of the exhaust mechanism makes it difficult to discharge impurities from the hydrogen gas circulation conduit. Thus, nitrogen gas is accumulated in the circulation conduit and the cells of the fuel cell, and thereby the hydrogen partial pressure decreases. To reduce the decrease in hydrogen partial pressure, the circulation mechanism is required to stop as disclosed in International Publication No. 2011/021301.

However, even though the circulation mechanism stops, a part of water generated by the power generation is vaporized if the fuel cell continues to generate electric power while the hydrogen gas exhaust conduit and the exhaust mechanism freeze. When the circulation mechanism stops, the water vapor cannot be discharged to the atmosphere. Thus, water vapor partial pressure increases in a clogged conduit. When the water vapor partial pressure increases, the water vapor is diffused in the hydrogen gas circulation conduit even when the circulation mechanism stops. When the circulation mechanism stops, the circulation mechanism cannot raise the temperature sufficiently. Thus, the diffused water vapor may cause the circulation mechanism to freeze.

Hereinafter, a description will be given of an embodiment of the present invention with reference to the accompanying drawings.

First Embodiment

Figure 1A:
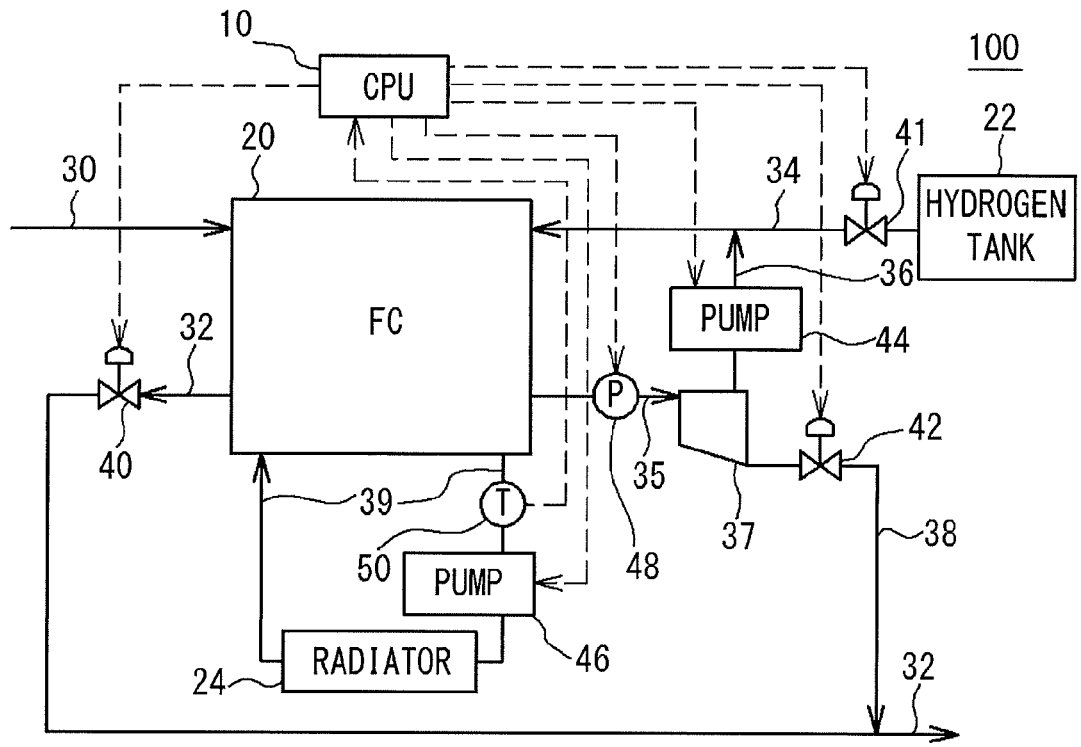
FIG. 1A is a block diagram illustrating a fuel cell system in accordance with a first embodiment.

FIG. 1A is a block diagram illustrating a fuel cell system 100 in accordance with a first embodiment. The fuel cell system 100 is installed in fuel cell vehicles, electric vehicles, or the like to be used as a system supplying a driving power source for driving wheels of the vehicle. As illustrated in FIG. 1A, the fuel cell system 100 includes a Central Processing Unit (CPU) 10, a fuel cell (FC) 20, a hydrogen tank 22, and a radiator 24 (heat exchanger). The CPU 10 is an example of a control unit. The hydrogen tank 22 is an example of a fuel supply source.

The fuel cell 20 connects to an air supply conduit 30, an air exhaust conduit 32, a fuel gas supply conduit 34, and a fuel gas exhaust conduit 35. A circulation conduit 36 is connected between the fuel gas supply conduit 34 and the fuel gas exhaust conduit 35. A gas-liquid separator 37 is disposed in the circulation conduit 36. The fuel gas supply conduit 34, the fuel gas exhaust conduit 35, and the circulation conduit 36 form a fuel gas path that allows hydrogen gas to circulate therethrough. Impurities such as nitrogen gas and water vapor as well as hydrogen gas circulate through the fuel gas path.

The fuel cell 20 also connects to a coolant conduit 39. Cooling water (coolant) flows into the fuel cell 20 through the coolant conduit 39, and cools the fuel cell 20. The cooling water that has been used for cooling is supplied to the radiator 24 through the coolant conduit 39. The coolant is cooled in the radiator 24, and is supplied again to the fuel cell 20.

A valve 40 is disposed in the air exhaust conduit 32, and a valve 41 is disposed in the fuel gas supply conduit 34. A valve 42 is disposed in an external exhaust conduit 38. The valve 40 controls the flow rate of air. The valve 41 controls the flow rate of fuel gas. The valve 42 is used to discharge a part of the fuel gas and the impurities from the fuel gas path to the outside. When the valve 42 opens, a part of the fuel gas and the impurities flow from the fuel gas path to the external exhaust conduit 38 to be discharged to the atmosphere.

A pressure sensor 48 is disposed in the fuel gas exhaust conduit 35, and detects pressure in the fuel gas path (the fuel gas supply conduit 34, the fuel gas exhaust conduit 35, the circulation conduit 36). A temperature sensor 50 is disposed in the vicinity of the outlet from the fuel cell 20 in the coolant conduit 39, and detects the temperature (water temperature) of the cooling water that has cooled the fuel cell 20. The temperature sensor 50 is an example a temperature detection unit. The water temperature correlates with the temperature of the fuel cell 20. Thus, the water temperature is low when the fuel cell 20 is low in temperature, while the water temperature is high when the fuel cell 20 is high in temperature. A pump 44 is disposed in the circulation conduit 36. A pump 46 is disposed in the coolant conduit 39. The pumps 44 and 46 are, for example, Roots pumps, screw pumps, or turbopumps.

Air is supplied to the air side electrode (oxidant electrode) of the fuel cell 20 from the atmosphere through the air supply conduit 30. Hydrogen gas is reserved in the hydrogen tank 22, and is supplied to the hydrogen side electrode (fuel electrode) of the fuel cell 20 through the fuel gas supply conduit 34. The fuel cell 20 generates electric power by using hydrogen gas as fuel gas and air containing oxygen as oxidant. The generated electric power is used in devices such as a motor for running the vehicle, illumination lumps, an air conditioner, and an audio device.

The air after the reaction in the fuel cell 20 is discharged to the outside through the air exhaust conduit 32. The hydrogen gas that has not been used in the reaction is discharged from the fuel gas exhaust conduit 35, circulates into the fuel gas supply conduit 34 via the circulation conduit 36, and is supplied again to the fuel cell 20.

The gas-liquid separator 37 separates impurities such as nitrogen gas and water and hydrogen gas with difference in specific gravity. The gas-liquid separator 37 has a slanted bottom, and the external exhaust conduit 38 is connected to the lowest part of the bottom. Impurities having heavy specific gravity are accumulated in the lower part of the gas-liquid separator 37, and discharged to the external exhaust conduit 38. The external exhaust conduit 38 connects to the air exhaust conduit 32, and the impurities are discharged from the external exhaust conduit 38 to the outside through the valve 42. On the other hand, hydrogen gas having low specific gravity flows from the gas-liquid separator 37 to the circulation conduit 36. A small amount of impurities circulates together with hydrogen gas.

Figure 1B:
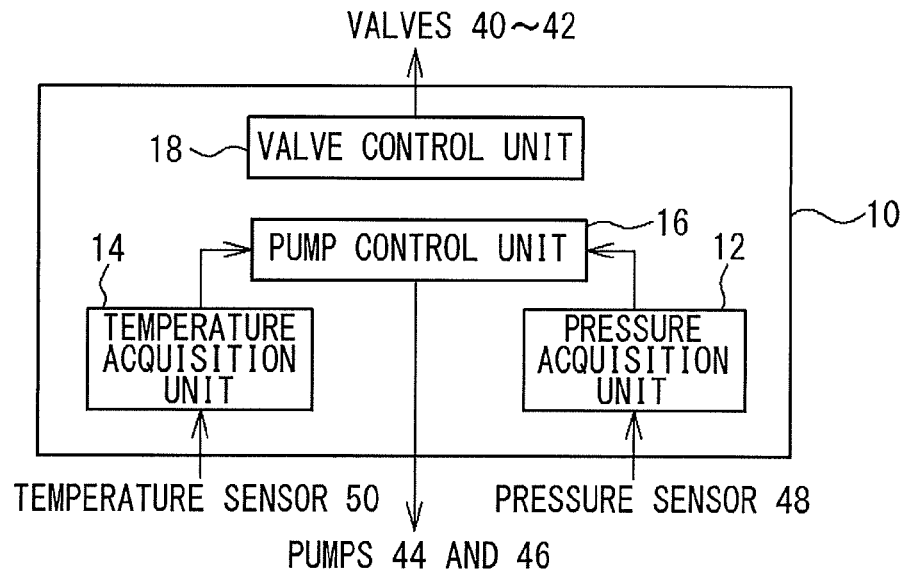
FIG. 1B is a functional block diagram illustrating a configuration of a control unit.

FIG. 1B is a functional block diagram illustrating a configuration of the CPU 10. As illustrated in FIG. 1B, the CPU 10 functions as a pressure acquisition unit 12, a temperature acquisition unit 14, a pump control unit 16, and a valve control unit 18. The pressure acquisition unit 12 acquires pressure detected by the pressure sensor 48. Additionally, the pressure acquisition unit 12 estimates an amount of emission from the valve 42 based on the difference between a pressure before an instruction to open the valve 42 is issued and a pressure after the instruction is issued (the amount of decrease in pressure). The temperature acquisition unit 14 acquires water temperature detected by the temperature sensor 50. The pump control unit 16 adjusts a circulation amount of gas in the fuel gas path by changing the driving state (rotational speed) of the pump 44, and also adjusts a flow rate of the cooling water by changing the driving state of the pump 46. The valve control unit 18 changes open/close states of the valves 40 through 42.

When the valve 42 illustrated in FIG. 1A is opened, impurities in the fuel gas path are discharged from the external exhaust conduit 38 to the atmosphere. However, at starting below a freezing point, the valve 42 may freeze and be clogged. In this case, the impurities are not discharged, and the amount of decrease in pressure in the fuel gas path decreases. The process described in the following is a process executed at starting below a freezing point.

FIG. 2 is a flowchart illustrating a process executed by the fuel cell system 100. As illustrated in FIG. 2, the valve control unit 18 instructs the valve 42 to open (step S10).

Then, the pressure acquisition unit 12 acquires pressure P from the pressure sensor 48, and estimates an amount of emission from the valve 42 based on the amount of decrease in pressure before and after the valve opening instruction and the hydrogen consumption amount (step S12).

The pump control unit 16 determines whether the estimated amount of emission (estimated emission amount) is less than a target emission amount (step S14). At this step, it is determined whether the valve 42 normally functions (whether the discharge from the valve 42 is normal). The target emission amount is an emission amount expected to be achieved in response to the valve opening instruction. When the determination is No at step S14, the CPU 10 proceeds to step S30. When the determination is Yes at step S14, the CPU 10 proceeds to step S16. The execution of step S14 allows the CPU 10 to determine whether the valve 42 is malfunctioning. That is to say, when the valve 42 is not freezing, the valve 42 opens in response to the valve opening instruction at step S10. Thus, the amount of decrease in pressure increases, and the estimated emission amount becomes the target emission amount. On the other hand, when the valve 42 is freezing, the valve 42 is malfunctioning, and fails to open or slightly opens. Thus, the amount of decrease in pressure decreases, and the estimated emission amount becomes less than the target emission amount.

When the determination is Yes at step S14, the pump control unit 16 stops the pump 44 at step S16. At this time, the circulation of hydrogen gas, nitrogen gas, and the like through the fuel gas path stops.

The temperature acquisition unit 14 acquires temperature (water temperature) T of the cooling water detected by the temperature sensor 50 (step S18).

The pump control unit 16 determines whether the water temperature T is equal to or greater than a predetermined temperature T1 (a first temperature, e.g., 30 to 40° C.) (step S20). When the determination is No, the CPU 10 returns to step S16. When the determination is Yes, the CPU 10 proceeds to step S22.

At step S22, the pump control unit 16 determines whether the water temperature T is less than a temperature T2 (a second temperature). The temperature T2 is greater than the temperature T1, and is, for example, 50° C. When the determination is No, the CPU 10 proceeds to step S30. When the determination is Yes, the CPU 10 proceeds to step S24.

At step S24, the pump control unit 16 drives the pump 44 at low rotational speed. The rotation of the pump 44 at low rotational speed allows the circulation speed of gas in the fuel gas path to become a first circulation speed. The first circulation speed is a circulation speed at which water fails to flow into the fuel cell 20, and is a circulation speed at which the concentration of nitrogen in the fuel cell 20 falls within an acceptable range for the estimated period of time taken for the valve 42 to recover to be normal (for the valve 42 to unfreeze). Making the concentration of nitrogen within the acceptable range allows the hydrogen partial pressure to be a favorable level. The drive of the pump 44 circulates hydrogen gas through the fuel gas path and pumps hydrogen gas into the fuel cell 20.

The pressure acquisition unit 12 acquires pressure P from the pressure sensor 48, and estimates the emission amount based on the amount of decrease in pressure and the hydrogen consumption amount (step S26).

The pump control unit 16 determines whether the estimated emission amount estimated at step S26 is equal to or greater than the target emission amount (step S28). At this step, it is determined whether the valve 42 normally functions (whether the discharge is normal). When the determination is No, the CPU 10 returns to step S26. When the determination is Yes, the CPU 10 proceeds to step S30.

At step S30, the pump control unit 16 drives the pump 44 at high rotational speed. The high rotational speed is a rotational speed at which the flow rate of hydrogen gas becomes most suitable for the fuel cell 20 to generate required electric power. The drive of the pump 44 at high rotational speed allows the circulation speed to become a second circulation speed greater than the first circulation speed. The second circulation speed is, for example, a circulation speed that is most suitable for the fuel cell 20 to generate required electric power. The process ends after step S30.

The first embodiment configures the pump control unit 16 to temporarily stop the pump 44 (step S16 of FIG. 2) when the discharge from the valve 42 is poor. Thus, the flow of nitrogen gas into the fuel cell 20 is reduced. Accordingly, the increase in nitrogen partial pressure and the decrease in hydrogen partial pressure are reduced, and thus the decrease in power generation voltage of the fuel cell 20 due to the lack of hydrogen gas is reduced. However, when the pump 44 is stopped for a long period of time, water generated by the power generation of the fuel cell 20 may freeze the pump 44. The first embodiment configures the pump control unit 16 to drive the pump 44 (step S24) when the valve 42 is determined to be malfunctioning, and the temperature T of the cooling water is equal to or greater than T1 and is less than T2. Accordingly, the pump 44 is prevented from freezing. At this time, although water vapor and nitrogen gas flow into the fuel cell 20 compared to the case where the pump 44 is stopped, the rotational speed of the pump 44 is low. Moreover, as the temperature of the fuel cell 20 has risen to some extent, the time taken for the valve 42 to normally operate is short. Accordingly, the amount of water vapor and nitrogen gas flowing into the fuel cell 20 till the valve 42 recovers to normally function can be decreased. Thus, the deterioration of the fuel cell 20 due to the decrease in hydrogen partial pressure can be prevented. That is to say, the first embodiment can prevent the deterioration of the fuel cell 20 as well as the freeze of the pump 44.

When the estimated emission amount is greater than the target emission amount, the pump control unit 16 drives the pump 44 at high rotational speed (step S30). When the estimated emission amount is greater than the target emission amount, the valve 42 is estimated to unfreeze (the discharge from the valve 42 is normal). Thus, nitrogen gas and water are normally discharged from the external exhaust conduit 38. Accordingly, even though nitrogen gas and water vapor circulate through the fuel gas path, the hydrogen partial pressure remains high. In addition, the temperature of the fuel cell 20 has risen to greater than the temperature at starting. Thus, even though water penetrates into the fuel cell 20, freezing hardly occurs. Accordingly, even though the pump 44 is rotated at high rotational speed most suitable for the fuel cell 20 to generate required electric power, the deterioration of the fuel cell 20 is prevented. As described above, the first embodiment can prevent the deterioration of the fuel cell and the freeze of the pump 44 at low temperature starting, and thus can achieve a normal operation state early.

When water flows into the fuel cell 20 while the temperature of the fuel cell 20 is low, the cells in the fuel cell 20 freeze. Thus, at step S24 of FIG. 2, the pump control unit 16 preferably drives the pump 44 at a rotational speed that achieves a circulation speed at which water fails to flow into the fuel cell 20.

The circulation speed achieved by the rotation of the pump 44 at step S24 is preferably less than the circulation speed at step S30, and is preferably a circulation speed at which the concentration of nitrogen calculated from the estimated period of time taken for the valve 42 to recover from a malfunction to a normal state falls within an acceptable range. Making the concentration of nitrogen within the acceptable range allows the hydrogen partial pressure to maintain 80 kPa or greater.

In the first embodiment, the pump 44 is driven at low rotational speed when the discharge from the valve 42 is not normal, and the water temperature T is equal to or greater than T1 and is less than T2. When the water temperature T is equal to or greater than T1 and is less than T2, water vapor exceeding a predetermined amount is estimated to be diffused in the fuel gas path. The drive of the pump 44 prevents the freeze of the pump 44. However, the configuration is not limited to that of the first embodiment. That is to say, parameters other than the water temperature T may be used as a parameter relating to water vapor. For example, the amount of water vapor in the fuel gas path, water vapor partial pressure, or the amount of water vapor generated from the fuel cell 20 may be used. When these parameters are equal to or greater than predetermined values, the pump 44 is driven at low rotational speed. Sensors used to measure the aforementioned parameters may be provided, and the CPU 10 may acquire these parameters from the sensors. Alternatively, the CPU 10 may acquire, for example, the water temperature T or the temperature of gas discharged from the fuel cell 20, and determine whether the parameter relating to water vapor is equal to or greater than a predetermined value from these temperatures. Two or more parameters may be used, or one of the aforementioned parameters may be used.

The first embodiment estimates the emission amount from the amount of decrease in pressure P when the valve opening instruction (discharge instruction) is issued, and detects the malfunction of the valve 42 by comparing the estimated emission amount and the target emission amount. However, this does not intend to suggest any limitation. For example, the pressure acquisition unit 12 may acquire the pressure P after the valve opening instruction is issued and determine whether the pressure P is equal to or greater than a predetermined pressure P1 to detect the malfunction of the valve 42. The pressure P1 as a threshold value is a pressure at which the discharge from the valve 42 is estimated to be normal. That is to say, when the valve 42 is not freezing, the valve 42 opens in response to the valve opening instruction, the discharge is performed as expected in accordance with the valve opening instruction, and the pressure P decreases to less than P1. On the other hand, when the valve 42 is freezing, the valve 42 is malfunctioning, and fails to open or slightly opens. Thus, the emission amount becomes less than the expected emission amount, and the pressure P becomes equal to or greater than P1 that is high. Alternatively, when the water temperature T detected by the temperature sensor 50 exceeds a predetermined threshold value (e.g., the aforementioned temperature T2), it may be determined that the valve 42 operates normally. The threshold value T2 is a temperature at which the valve 42 is estimated to unfreeze.

The water vapor partial pressure sharply increases at 30 to 40° C. This increase may diffuse water vapor throughout the entire of the fuel gas path, and the pump 44 may freeze accordingly. Therefore, the temperature T1 is preferably set to 30 to 40° C. The drive of the pump 44 at a timing when the water temperature T becomes equal to or greater than T1 prevents the freeze of the pump. The temperatures T1 and T2 can be changed from the aforementioned values.

The temperature sensor 50 is preferably located further upstream than the radiator 24 of the coolant conduit 39, and is preferably located especially in the vicinity of the outlet of the cooling water of the fuel cell 20. This is because the temperature of the cooling water immediately after used for cooling can be detected.

Instead of the pump 44, an ejector may be used as a circulation mechanism for hydrogen, for example. When an ejector is used, the CPU 10 controls the hydrogen supply rate from the hydrogen tank 22 and the opening degree of the ejector to change the circulation speed. An exhaust mechanism other than the valve 42 may be used.

Although some embodiments of the present invention have been described in detail, the present invention is not limited to the specific embodiments but may be varied or changed within the scope of the present invention as claimed.

What is claimed is:

1. A fuel cell system comprising:
   a fuel cell;
   a fuel supply source;
   a fuel gas path that is connected to the fuel cell, is supplied with fuel from the fuel supply source, and allows a part of fuel gas discharged from the fuel cell to circulate therethrough;
   an exhaust mechanism that discharges the fuel gas after reaction in the fuel cell to an outside;
   a circulation mechanism that is disposed in the fuel gas path and circulates the fuel gas; and
   a control unit, wherein
   the control unit temporarily stops circulation of the fuel gas by the circulation mechanism when determining that discharge from the exhaust mechanism is not normal,
   the control unit drives the circulation mechanism so that the fuel gas circulates at a first circulation speed when determining that the discharge from the exhaust mechanism is not normal and a parameter relating to water vapor in the fuel gas path is equal to or greater than a predetermined value, and
   the control unit drives the circulation mechanism so that the fuel gas circulates at a second circulation speed when determining that the discharge from the exhaust mechanism is normal, the first circulation speed being less than the second circulation speed.

2. The fuel cell system according to claim 1, further comprising:
   a temperature detection unit configured to detect a temperature of a coolant that cools the fuel cell, wherein
   the control unit determines that the parameter relating to water vapor in the fuel gas path is equal to or greater than the predetermined value when the temperature of the coolant detected by the temperature detection unit is equal to or greater than a first temperature, and determines that the discharge from the exhaust mechanism is not normal when the temperature of the coolant is less than a second temperature that is greater than the first temperature.

3. The fuel cell system according to claim 1, further comprising:
   a pressure sensor configured to detect a pressure in the fuel gas path, wherein
   the control unit determines whether the discharge from the exhaust mechanism is normal based on an amount of decrease in the pressure in the fuel gas path in a predetermined period of time before and after an opening of a valve when an instruction to the exhaust mechanism to discharge the fuel gas after reaction is issued.

4. The fuel cell system according to claim 1, wherein
   the control unit determines the first circulation speed so that a concentration of nitrogen calculated from an estimated period of time taken for the discharge from the exhaust mechanism to be normal falls within an acceptable range.

5. The fuel cell system according to claim 1, wherein
   the exhaust mechanism is a valve,
   the circulation mechanism is a pump, and
   the control unit sets a rotational speed of the pump to a first rotational speed to achieve the first circulation speed, and sets the rotational speed of the pump to a second rotational speed to achieve the second circulation speed.

6. A fuel cell system comprising:
a fuel cell;
a fuel supply source;
a fuel gas path that is connected to the fuel cell, is supplied with fuel from the fuel supply source, and allows a part of fuel gas discharged from the fuel cell to circulate therethrough;
an exhaust mechanism that discharges the fuel gas after reaction in the fuel cell to an outside;
a circulation mechanism that is disposed in the fuel gas path and circulates the fuel gas;
a temperature detection unit configured to detect a temperature of a coolant that cools the fuel cell; and
a control unit, wherein
the control unit temporarily stops circulation of the fuel gas by the circulation mechanism when determining that discharge from the exhaust mechanism is not normal,
the control unit drives the circulation mechanism so that the fuel gas circulates at a first circulation speed when determining that the discharge from the exhaust mechanism is not normal and the temperature of the coolant detected by the temperature detection unit is equal to or greater than a predetermined temperature, and
the control unit drives the circulation mechanism so that the fuel gas circulates at a second circulation speed when determining that the discharge from the exhaust mechanism is normal, the first circulation speed being less than the second circulation speed.

* * * * *